United States Patent [19]

Eberle

[11] 3,888,920

[45] June 10, 1975

[54] ARYL SUBSTITUTED-4-ALKENOIC ACIDS

[75] Inventor: Marcel K. Eberle, Madison, N.J.

[73] Assignee: Sandoz, Inc., E. Hanover, N.J.

[22] Filed: Aug. 6, 1973

[21] Appl. No.: 386,085

[52] U.S. Cl. ............. 260/515 R; 260/408; 260/413; 260/469; 260/476 R; 260/488 CD; 260/488 H; 260/515 A; 424/317
[51] Int. Cl. ............................................ C07c 63/30
[58] Field of Search ..................... 260/515 A, 515 R

[56] References Cited
UNITED STATES PATENTS
2,526,108   10/1950   Arnold................................ 260/515
FOREIGN PATENTS OR APPLICATIONS
1,422,812   11/1965   France................................ 260/515

OTHER PUBLICATIONS

Allen et al. Chem. Abstracts, Vol. 31 (1937), pages 3896–3897.

Primary Examiner—James A. Patten
Attorney, Agent, or Firm—Gerald D. Sharkin; Robert S. Honor

[57] ABSTRACT

Aryl substituted-4-alkenoic acids, e.g., 2,2,3-triphenyl-4-pentenoic acids, are prepared from a corresponding diphenyl acetic acid, cinnamyl alcohol ester, and are useful in replacement therapy for estrogen deficiencies.

2 Claims, No Drawings

ARYL SUBSTITUTED-4-ALKENOIC ACIDS

This invention relates to aryl substituted-4-alkenoic acids which exhibit estrogenic activity. In particular, it relates to phenyl substituted alkenoic acids, pharmaceutically acceptable acid addition salts thereof, intermediates and processes for their preparation and their use in replacing estrogen deficiencies.

The compounds of this invention may be represented by the formula:

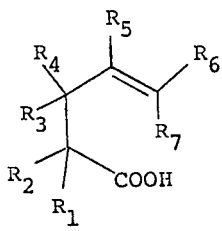
(I)

where
$R_1$, $R_2$, and $R_3$ each independently represent hydrogen, straight chain lower alkyl, i.e., alkyl having 1 to 4 carbon atoms, e.g., methyl, ethyl, propyl and the like or

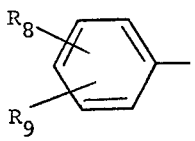

wherein $R_8$ and $R_9$ each independently represents hydrogen or halo having an atomic weight of 19 to 36, and $R_4$, $R_5$, $R_6$, and $R_7$ each independently represents hydrogen or straight chain lower alkyl, as defined above, provided that at least one of $R_1$, $R_2$, and $R_3$ is other than hydrogen or straight chain lower alkyl, or pharmaceutically acceptable acid addition salts thereof.

The compounds of formula (I) are prepared according to the following reaction scheme

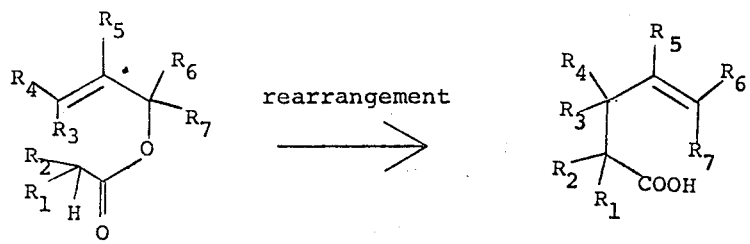

where $R_1$, $R_2$, $R_3$, $R_4$, $R_5$, $R_6$, $R_7$ and the proviso are as set out above.

The compounds of formula (I) are prepared by the rearrangement of a compound of formula (II) in an inert solvent under an inert atmosphere in the presence of a lithiated secondary amine catalyst such as N-isopropylcyclohexylamine. The inert atmosphere can be argon, neon, nitrogen and the like, preferably nitrogen. The preferred solvents are dimethylacetamide, ether, or tetrahydrofuran, the latter being especially preferred. It is also preferred that the reaction be run in the presence of trimethyl silane. The temperature of the reaction is not critical, but it is preferred that the reaction be carried out between about −80° to 200°C., especially the reflux temperature of the solvent. The reaction is run from about 2 to 24 hours, preferably from about 6 to 14 hours.

The compounds of formula (II) are prepared according to the following reaction scheme:

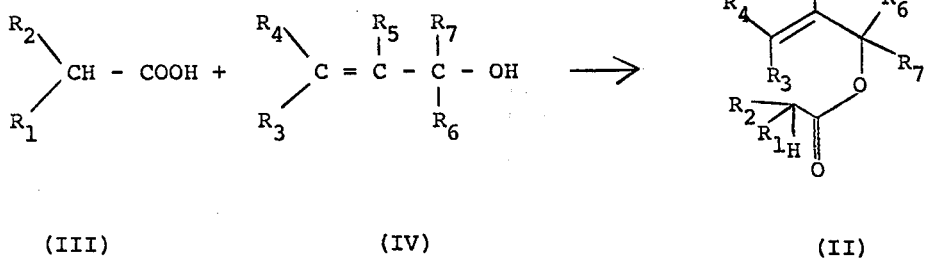

(III)  (IV)  (II)

where $R_1$, $R_2$, $R_3$, $R_4$, $R_5$, $R_6$, $R_7$ and the proviso are as set out above.

The compounds of formula (II) are prepared by the reaction of a compound of formula (III) with a compound of formula (IV) in an inert solvent in the presence of N,N′-dicyclohexylcarbodiimide. The reaction is preferably carried out under an inert atomsphere such as argon, neon, nitrogen and the like, preferably nitrogen. The particular solvent employed is not critical, but it is preferred that the reaction be carried out in the presence of an inert solvent, e.g., halogenated hydrocarbon such as methylene dichloride, ethylene dichloride, or carbon tetrachloride, the latter being especially preferred. The temperature of the reaction is not critical, but it is preferred that the reaction be carried out between about 0° to 100°C., especially at the reflux temperature of the solvent. The reaction is run from about 2 to 20 hours, preferably from about 6 to 14 hours. The product is recovered using conventional techniques, e.g., filtration and evaporation.

Many of the compound of formulae (III) and (IV) are known and may be prepared by methods described in the literature. The compounds of formulae (III) and (IV) not specifically disclosed may be prepared by analogous methods from known starting materials.

The compounds of formula (I) are useful because they possess pharmacological properties in animals. In particular, they possess estrogenic activity and useful in replacement therapy for estrogen deficiencies In spayed rats prepared by standard techniques for vaginal smear assay, in which 30 milligrams of the test compound are administered intragastrically or in a powdered diet for 3 days. Vaginal smears are taken 72 hours and 80 hours following the first treatment. Fresh smears are scored as positive or negative according to the method of Biggers and Claringbold (Endocrinology 11:277, 1954): i.e., the absence of leucocytes plus cornfied epithelial or nucleated epithelial cells in the smear is considered a positive response to the test drug and all other smears are considered negative.

For such usage, the compounds (I) may be combined with a pharmaceutically acceptable carrier or adjuvant and may be administered orally or parenterally as such or admixed with conventional pharmaceutical carriers. They may be administered in such form as tablets, dispersible powders, granules, capsules, syrups and elixirs and parenterally as solutions, suspensions, dispersions, emulsions and the like, e.g., a sterile injectable aqueous solution, preferably tablets and capsules. The dosage will vary depending upon the mode of administration utilized and the particular compound employed.

Furthermore, the compounds of formula (I) may be administered in the form of their pharmaceutically acceptable salts such as the sodium, potassium, calcium, magnesium, and the like salts and such salts are included within the scope of the present invention. The salts are prepared by conventional techniques, e.g., by dissolving the ester in a suitable solvent, e.g., water or lower alkanol such as methanol, ethanol and the like or in a mixture of water and lower alkanol and treating the ester with an oxide or hydroxide of the desired cation. Conversely the salts are converted back to the esters by treatment with an acid, e.g., sulfuric acid, hydrochloric acid, and the like in a similar solvent.

The estrogenic effective dosage of compounds (I) employed in the replacement of estrogen deficiencies will vary depending on the particular compound employed and the severity of the condition being treated. However, in general, satisfactory results are obtained when the compounds are given at a daily dosage of from about 0.015 to about 50 milligrams per kilogram of animal body weight, preferably given once a day depending upon the condition being treated. For most large mammals, the total daily dosage is from about 1 milligram to about 100 milligrams. Dosage forms suitable for internal use comprise from about 0.25 to about 50 milligrams of the active compound in intimate admixture with a solid or liquid pharmaceutically acceptable carrier or diluent.

A representative formulation suitable for oral administration once a day is a capsule prepared by standard encapsulating techniques which contains the following:

| Ingredients | Weight (mg) |
| --- | --- |
| 2,2,3-triphenyl-4-pentenoic acid. | 5 |
| Inert solid diluent (starch, lactose, kaolin). | 95 |

EXAMPLE I

Diphenyl acetic acid, cinnamyl alcohol ester.

To a flask equipped with a stirrer, dropping funnel, condenser and gas inlet tube maintained under a nitrogen atmosphere, there is added 42.4g of diphenyl acetic acid, 26.8g of cinnamyl alcohol and 41.2g of N,N'-dicyclohexylcarbodiimide in 200 ml of carbon tetrachloride. The resulting mixture is heated at the reflux temperature of the solvent for 12 hours. The solution is then chilled and the resulting solids are removed by filtration and washed with additional carbon tetrachloride. The solvents are combined and washed with water. After separating the aqueous phase, the solvent is evaporated in vacuo, and an oil is obtained which is then chromatographed on silica-gel with benzene to obtain diphenyl acetic acid, cinnamyl alcohol ester, m.p. 63°–64°C.

Following the above procedure and using in place of diphenyl acetic acid an equivalent amount of:
  a. p-chlorophenyl acetic acid,
there is obtained
  a. p-chlorophenyl acetic acid, cinnamyl alcohol ester. Again, when the above process is carried out and there is used in place of diphenyl acetic acid an equivalent amount of phenyl acetic acid, and using in place of cinnamyl alcohol an equivalent amount of:
  b. methallyl alcohol,
  c. 2-buten-1-ol, or
  d. 3-penten-2-ol,
there is obtained
  b. phenyl acetic acid, methallyl alcohol ester,
  c. phenyl acetic acid, 2-buten-1-ol ester, or
  d. phenyl acetic acid, 3-penten-2-ol ester,
respectively. Finally, when carrying out the above process and using in place of the diphenyl acetic acid an equivalent amount of 3,4-dichlorophenyl acetic acid and using in place of cinnamyl alcohol an equivalent amount of allyl alcohol, there is obtained
  e. 3,4-dichlorophenyl acetic acid, allyl alcohol ester.

EXAMPLE II 2,2,3-Triphenyl-4-pentenoic acid.

To a solution of 9.9g of N-isopropylcyclohexylamine in 50 ml of absolute tetrahydrofuran maintained under a nitrogen atmosphere, there is added 1.6M of butyllithium in benzene. There is then added slowly 20g of diphenyl acetic acid, cinnamyl alcohol ester in 200ml of tetrahydrofuran followed by the addition of 7.6g of trimethyl silane. The resulting mixture is allowed to warm to room temperature and is then heated at reflux for two hours. The solvents are distilled under reduced pressure, and the resulting residue is dissolved in ether and extracted with 50 ml of 2N sodium hydroxide. The aqueous phase is then acidified with 50 ml of 2N hydrochloric acid and extracted with ether to give 2,2,3-triphenyl-4-pentenoic acid, m.p. 162°–163°C.

The 2,2,3-triphenyl-4-pentenoic acid of this example is an effective estrogenic agent when administered once a day at a dosage of 5 mg.

Following the above procedure and using in place of diphenyl acetic acid, cinnamyl alcohol ester an equivalent amount of:
  a. p-chlorophenyl acetic acid, cinnamyl alcohol ester,
  b. phenyl acetic acid, methallyl alcohol ester,
  c. phenyl acetic acid, 2-buten-1-ol ester,
  d. phenyl acetic acid, 3-penten- 2-ol ester, or
  e. 3,4-dichlorophenyl acetic acid, allyl alcohol ester,
there is obtained
  a. 2-(p-chlorophenyl)-3-phenyl-4-pentenoic acid, m.p. 143°–150°C.,
  b. 4-methyl-2-phenyl-4-pentenoic acid,
  c. 3-methyl-2-phenyl-4-pentenoic acid,
  d. 5-methyl-2-phenyl-4-hexenoic acid, or e. 2-(3,4-dichlorophenyl)-4-pentenoic acid, respectively.

What is claimed is:

1. The compound which is 2,2,3-triphenyl-4-pentenoic acid.

2. The compound which is 2-(p-chlorophenyl)-3-phenyl-4-pentenoic acid.

* * * * *